United States Patent [19]

Loscuito

[11] Patent Number: 5,246,775
[45] Date of Patent: Sep. 21, 1993

[54] SELF-STICKING DRYWALL TAPE

[76] Inventor: Salvatore M. Loscuito, 1203 Keeler Ave., Mamaroneck, N.Y. 10543

[21] Appl. No.: 816,469

[22] Filed: Jan. 3, 1992

[51] Int. Cl.⁵ .............................................. B32B 9/00
[52] U.S. Cl. .................................... 428/343; 428/138; 428/202; 428/906; 428/131; 428/195; 428/40; 52/417; 52/420
[58] Field of Search ............... 428/343, 906, 131, 195, 428/138, 202; 52/417, 420

[56] References Cited

U.S. PATENT DOCUMENTS 2,314,523 3/1943 Speer ...................................... 52/417
4,792,473 12/1988 Vitale ................................... 428/343

Primary Examiner—Patrick J. Ryan
Assistant Examiner—Abraham Bahta
Attorney, Agent, or Firm—Notaro & Michalos

[57] ABSTRACT

A tape for seams in drywall constructions comprises an elongated paper tape member having a pattern of holes therein. The holes are aligned in rows extending across the width of the tape with one row being spaced from the other along the length of the tape. An acrylic adhesive is applied to one surface of the tape so that it can be attached by the adhesive to a drywall seam. Compound placed onto the outer surface of the tape penetrates the perforations, holding the tape to the seam.

16 Claims, 1 Drawing Sheet

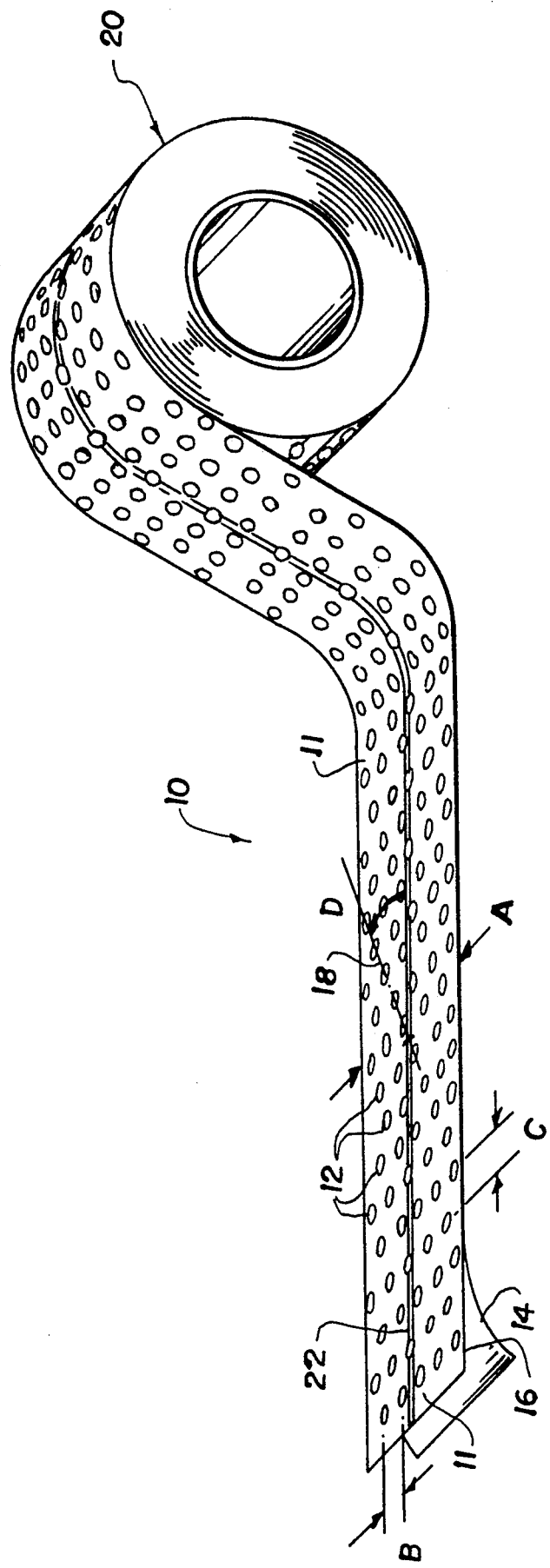

SELF-STICKING DRYWALL TAPE

FIELD AND BACKGROUND OF THE INVENTION

The present invention relates in general to tape for drywall construction, and in particular to a new and useful perforated paper tape having an adhesive back which expedites its application and use when constructing with wet wall, drywall, sheetrock and plasterboard products.

Any material or technique that decreases labor costs by reducing the time it takes to finish any particular part in a construction sequence would be welcomed by contractors. Labor productivity is a variable that most builders have at least some control over by utilizing the newest processes and tools.

The use of drywall or sheetrock is widely used for interior surfaces. For convenience the term drywall will be used in this disclosure to encompass sheetrock, plaster board and any other similar products which are provided in large area sheets for covering wall surfaces.

The first step in preparing seams in drywall construction for painting, is to apply tape to the seams. Such known tape is made of pulp paper and comes, for example, in rolls of 250 linear feet. The tape which is about 2 inches wide, is used in conjunction with a wet compound or plaster and requires a great deal of skill in its application to ensure that there are no wrinkles in the tape, bubbles under the tape or uneven layers of compound. The tape is then sanded and feathered so that when the wall is painted there are no seams showing.

While the forgoing process is time consuming and requires considerable skill for flat surface seams between drywall pieces, even greater skill is required for inside corner seams. To aid in the application of known paper tape to such seams, the known tape products are provided with a longitudinally extending central crush line which facilitates folding of the tape at its center and along its length.

In addition to paper tape, open fiberglass mesh has been used for the same purpose. The mesh is also supplied in 2 inch wide rolls and is in the form of a square mesh product with adhesive on one side. For application, the fiberglass mesh is first applied to the seam area and the wet compound is then applied over the top of the mesh and seam. Since no central fold line is provided, it is extremely difficult to use this type of product on inside corners. It is both difficult to fold the mesh exactly at its center and even more difficult to apply plaster using conventional knives which tend to rip the delicate mesh structure.

A wide variety of packing tapes are also known which have adhesive on one side, with or without a protective backing over the adhesive. None of these products are useful as seam tape in wet or drywall construction.

In designing seam tape of this type, the environment in which the tape will be applied and, for a much greater period of time, used, must be taken into account. Problems of wrinkles, bubbles and compatibility with compound both in its wet state and after it dries, must be taken into account.

A need remains for a seam tape product which avoids the high skill, time consuming application technique currently utilized, but which produces a long lasting effective seam.

SUMMARY OF THE INVENTION

The present invention is a self-sticking perforated drywall tape which is preferably made of paper or other porous material which is compatible with wet and dry compound, and which has on one side thereof pressure sensitive acrylic adhesive which has a moderate level of stickiness. The adhesive layer is covered by a backing to avoid the sticking of one coil in a roll of the tape to the next coil. A longitudinally extending pressure line or crease, which is here generically referred to as a fold line, is provided along the longitudinal center of the tape, to facilitate use of the tape on inside corners.

The tape of the present invention can be adhered by workers having low skill, on dry surfaces of drywall across a seam in the drywall, including inside corner seams. The adhesive of moderate stickiness allows for this tape to be temporarily removed and reapplied for proper positioning. The moderate adhesiveness is also important to avoid for the removal of wrinkles and bubbles from under the tape, which are fatal to the final seam. The invention provides a time savings of 40% to 50% and can be used by homeowners and unskilled labor instead of requiring the skill of a master tradesman as in the prior technique.

The tape must be perforated and advantageously has a porosity due to the perforations, which is here defined as the area of holes through the tape to the total area, of approximately $\frac{1}{8}$ to $\frac{2}{3}$. It is essential that holes through the tape have a size between 1/16 to $\frac{1}{4}$ inch to provide adequate contact between compound applied to the top of the tape, and the drywall under the tape. The size, spacing and shape of the holes are selected to achieve the porosity required, and are advantageously at a pitch across the tape of from 3/16 to $\frac{3}{4}$ inch and a longitudinal space along the length of tape of approximately $\frac{1}{8}$ to $\frac{1}{4}$ inch. The holes in one row are staggered with respect to the holes in the next row so that diagonal rows of holes are formed having an angle to the longitudinal extent of the tape between 45° and 65°.

While the holes are advantageously circular, they may be oval, oblong, star shaped, polygonal or have any other desired shape.

The tape is advantageously 2 inches wide but may be any where from $1\frac{3}{4}$ or $2\frac{1}{2}$ inches wide.

The backing material may be craft silicone release liner, waxed paper or other material which can temporarily adhere to the adhesive but be removable in an easy fashion.

The adhesive can be applied to the paper tape by application of the adhesive to the backing, followed by pressing of the tape against the backing. The adhesive is transferred from the backing to the paper tape where it is permanently adhered to the paper tape and temporarily adhered to the backing. Other known adhesive application techniques can also be utilized such as direct application to the paper tape or the use of a double sided tape between the paper tape and the backing.

According an object of the present invention is to provide a self-sticking perforated drywall tape which is extremely easy to apply using moderate to low skilled labor and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only FIGURE in the drawing is a perspective view showing a roll of perforated drywall tape according to the present invention, with a length unrolled to better illustrate the pattern of perforations, and the backing partly peeled from an end portion of the tape.

DESCRIPTION OF THE PREFERRED EMBODIMENT

Referring to the drawing in particular, the invention embodied therein comprised a drywall tape generally designated 10 which is advantageously supplied on a roll of tape 20 containing preferably 100 to 200 feet of tape. A 100 foot roll may be for home use, for example, and a 200 foot roll for commercial use.

The tape is made of repulpable paper, pulp paper or other porous or wettable material which is compatible with wet compound or plaster and the compound or plaster after it has dried. The tape advantageously has a width A of from 1¾ to 2½ inches with a preferable width of about 2 inches. A pattern of perforations 12 is provided through the tape product and may extend through a backing 14 covering adhesive 16 on the bottom surface of the paper layer 11 of the tape. The distance between perforations 12 lying in rows across the tape 10 shown as dimension B, is advantageously 3/16 to 1 inch depending on the diameter or the size of the perforations 12 with the longitudinal spacing or pitch C being advantageously ⅛ to ¾ inch. The diameter of the perforations 12 which may be circular or any other shape including oblong, oval, square, star shaped and the like, is advantageously 1/16 to ¼ inch.

Preferred dimensions for the cross pitch B is ⅜ inch, for the longitudinal pitch C is ¼ inch and for the diameter is ⅛ inch.

The perforations are staggered with respect to each other from one row to the next along the longitudinal length of the tape to produce diagonal rows of tape which have an angle D of about 45° to about 65° and advantageously about 55°.

A fold line, crushed line or crease 22 extends along the middle of the tape and along its entire length.

Backing 14 which may be perforated along with paper tape layer 11, or not, is advantageously made of craft silicone release liner, wax paper, inexpensive plastic or other material which is temporarily adhered to the adhesive layer 16. Adhesive 16 is advantageously pressure sensitive acrylic adhesive which has moderate sticking properties to drywall.

The tape of the present invention has been subjected to a large number of field tests to verify its effectiveness.

In eleven initial field tests, a variety of adhesives were utilized. Adhesives with a strong adhesive property were found to stick too easily and too permanently to drywall, making it difficult to remove wrinkles, bubbles and to properly center the tape. These field tests revealed the usefulness of adhesive such as pressure sensitive acrylic adhesive, which has a moderate adhesion property. This type of adhesive also has long term aging quality and may include rubber or synthetic stabilizers.

A twelfth test was conducted on pieces of sheetrock each coated with three coats of compound and the tape of the invention at seams between the sheetrock. The sheetrock was allowed to dry for three days and monitored for cracking, peeling or bubbles. No such defects were located.

Field test thirteen was conducted at a job sight where the tape of the present invention was utilized on an inside corner. Other seams and corners were covered using both the tape and technique of the present invention and the prior art tape and technique. After completion, no difference of quality was observed between the corners and seams used with the present invention and those used with convention materials and techniques.

Job fourteen was conducted at a job sight where approximately fifty sheetrock boards were installed in the basement of a private residence. All seams were completed with the technique and tape of the present invention and all were observed to be free of cracks, bubbles or any other defects.

Test fifteen was conducted in a four room basement apartment which was surfaced with sheetrock and the tape and technique of the present invention. The results revealed flawless seams having the same quality of seams produced according to the prior art.

Additional field tests have also confirmed the usefulness and effectiveness of the present invention.

While a specific embodiment of the invention has been shown and described in detail to illustrate the application of the principles of the invention, it will be understood that the invention may be embodied otherwise without departing from such principles.

What is claimed is:

1. Tape for seams in a drywall construction, comprising:

an elongated tape member of porous material compatible with a drywall compound having a selected width large enough to cover a drywall seam, an outer surface for facing away from the drywall seam, and an inner surface for facing toward the drywall seam;

a layer of pressure sensitive acrylic adhesive on the inner surface of the tape member for adhering the tape member to the drywall seam, the adhesive having moderate sticking properties such that the tape can be removed from the drywall seam and can be reapplied to the drywall seam for proper positioning; and a pattern of perforations through the tape member and the layer of adhesive, the pattern comprising a multiplicity of spaced perforations distributed evenly across and along the tape member for penetration by the drywall compound for application over the tape member on the drywall seam, the tape member having a ratio between a total area of all perforations in the tape member, to a total area of the tape member of approximately ⅛ to ⅜.

2. Tape according to claim 1 including a fold line in said tape member lying centrally of said selected width and along a full length of said tape member.

3. Tape according to claim 2 wherein said width is about from 1¾ to 2½ inches.

4. Tape according to claim 3 wherein said pattern of perforations comprises a multiplicity of rows of perforations extending across said width and spaced along the length of said tape member, each perforation in one row being spaced at a cross pitch distance of about from 3/16 to one inch and each row being spaced from an adjacent row along the length said tape member by a longitudinal pitch of about ⅛ to ¾ inch.

5. Tape according to claim 4 wherein each perforation has a dimension of about 1/16 to ¼ inch.

6. Tape according to claim 5 wherein perforations in one row are staggered with respect to perforations in an adjacent row along said tape member.

7. Tape according to claim 6 wherein said cross pitch is about ⅜ inch said longitudinal pitch is about ¼ inch and each perforation is about ⅛ inch in size.

8. Tape according to claim 1 wherein the ratio between the total area of all perforations in the tape member, to the total area of the tape member is about ½.

9. Tape according to claim 1 wherein said pattern of perforations comprises a multiplicity of rows of perforations extending across said width and spaced along the length of said tape member, each perforation in one row being spaced at a cross pitch distance of from 3/16 to one inch and each row being spaced from an adjacent row along the length said tape member by a longitudinal pitch of ⅛ to ¾ inch.

10. Tape according to claim 9 wherein each perforation has a dimension of 1/16 to ¼ inch.

11. Tape according to claim 10 wherein perforations in one row are staggered with respect to perforations in an adjacent row along said tape member.

12. Tape according to claim 8 wherein the perforations each have a size of about ⅛ of, the tape member being made of paper.

13. Tape according to claim 12 wherein the adhesive comprises pressure sensitive acrylic adhesive.

14. Tape according to claim 2 including a backing covering the layer of adhesive and removably attached by the adhesive to said tape member.

15. Tape according to claim 7 including a backing covering the layer of adhesive and removably attached by the adhesive to said tape member.

16. Tape according to claim 1 including a backing covering the layer of adhesive and removably attached by the adhesive to said tape member.

* * * * *